US007598448B2

(12) United States Patent
Ohba

(10) Patent No.: US 7,598,448 B2
(45) Date of Patent: Oct. 6, 2009

(54) PRELIMINARY DATA PRODUCER CORRELATING MUSIC DATA WITH ACTUAL MOTION, AUTOMATIC PLAYER AND MUSICAL INSTRUMENT

(75) Inventor: Yasuhiko Ohba, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 584 days.

(21) Appl. No.: 11/360,317

(22) Filed: Feb. 22, 2006

(65) Prior Publication Data

US 2006/0213357 A1 Sep. 28, 2006

(30) Foreign Application Priority Data

Mar. 23, 2005 (JP) ............................ 2005-084531

(51) Int. Cl.
*G01P 3/00* (2006.01)
*G10H 1/02* (2006.01)

(52) U.S. Cl. ............................................ 84/626; 84/21

(58) Field of Classification Search ..................... 84/13, 84/21, 626

See application file for complete search history.

(56) References Cited

U.S. PATENT DOCUMENTS

| | | | | |
|---|---|---|---|---|
| 7,265,281 | B2 * | 9/2007 | Sasaki et al. | 84/13 |
| 7,285,718 | B2 * | 10/2007 | Sasaki | 84/744 |
| 7,405,350 | B2 * | 7/2008 | Sasaki | 84/13 |
| 7,432,430 | B2 * | 10/2008 | Sasaki | 84/462 |
| 2005/0145104 | A1 * | 7/2005 | Sasaki | 84/746 |
| 2005/0247182 | A1 * | 11/2005 | Sasaki et al. | 84/13 |
| 2006/0000339 | A1 * | 1/2006 | Sasaki | 84/13 |
| 2006/0065103 | A1 * | 3/2006 | Sasaki | 84/600 |
| 2006/0213357 | A1 * | 9/2006 | Ohba | 84/723 |

* cited by examiner

*Primary Examiner*—Jeffrey Donels
(74) *Attorney, Agent, or Firm*—Morrison & Foerster LLP

(57) ABSTRACT

An automatic player piano is equipped with a preliminary data producer comprising an experimental routine and an editor; a motion controller forces each of the black and white keys to travel on a test trajectory at different values of key velocity so that the black or white key gives rise to rotation of hammer by means of an action unit, and a hammer sensor varies the magnitude of a hammer position signal depending upon the current hammer position; the hammer velocity is converted to a value of MIDI velocity so that a table producer correlates the values of key velocity with the values of MIDI velocity; while an automatic player is performing a music passage, the motion controller exactly determines a value of key velocity on the basis of the relation already determined by the preliminary data producer.

20 Claims, 8 Drawing Sheets

| | | |
|---|---|---|
| t | V | Kn |
| t | V | Kn |
| ⋮ | ⋮ | ⋮ |

| Kn | R.no. 1 | ..... | R.no. 9 |
|---|---|---|---|
| 1 | Ref1(Rmin) | ..... | Ref9(Rmax) |
| ⋮ | ⋮ | ⋮ | ⋮ |
| 88 | Ref1(Rmin) | ..... | Ref9(Rmax) |

PRELIMINARY DATA PRODUCER CORRELATING MUSIC DATA WITH ACTUAL MOTION, AUTOMATIC PLAYER AND MUSICAL INSTRUMENT

FIELD OF THE INVENTION

This invention relates to an automatic playing technology and, more particularly, to a preliminary data producer for correlating music data with actual motion of component parts of a musical instrument, an automatic player for producing tones without any fingering of a human player and a musical instrument equipped therewith.

DESCRIPTION OF THE RELATED ART

Pianos are so popular to music fans that description is hereinafter made on the pianos as a typical example of the musical instruments. The piano is fabricated from a lot of parts such as a keyboard, action units, hammers, strings and so forth. The keyboard includes white keys and black keys, and the black keys and white keys are laid on the well-known pattern. The black and white keys are respectively connected to the action units, and the action units respectively drive the hammers for rotation toward the associated strings. The strings are designed to produce tones on the scale different in pitch from one another, and the pitch names of the tones are uniquely assigned to the black and white keys. For this reason, a player can specify the tones to be produced by means of the black and white keys.

A player is assumed to depress a white key. The front portion of the white key sinks toward the key bed, and the rear portion pushes up the action unit. Thus, the player gives rise to the rotation of the action unit through the white key. The action unit makes the jack, which is a component part of the action unit, escape from the hammer on the way toward the end position, and the hammer starts to rotate toward the string. The hammer is brought into collision with the string at the end of the rotation, and gives rise to the vibrations of the string. The vibrating string excites the air, and the vibrations are propagated through the air as the tone.

The faster the hammer is, the stronger the collision is; the stronger the collision is, the louder the tone is. Since the force is transmitted from player's fingers through the black and white keys to the hammers, the player can control the loudness of the tones by changing the force exerted on the black and white keys. The black and white keys are moved proportionally to the force. Thus, it is possible to presume the loudness of tones on the basis of the key velocity.

The relation among the key velocity, hammer velocity and loudness of tones makes it possible to reproduce the tones by means of an automatic player. A typical example of the automatic player includes solenoid-operated key actuators and a controller. The solenoid-operated key actuators are installed under the rear portions of the black and white keys, respectively, and are selectively energized with a driving signal by the controller. If a tone is to be produced at large loudness, the controller increases the amount of current passing through the solenoid-operated key actuator, and causes the solenoid-operated key actuator to exert strong force on the black/white key. Then, the black/white key is moved at high speed, and makes the hammer violently brought into collision with the string. The string vibrates at wide amplitude, and the tone is produced at large loudness. On the other hand, if a tone is to be produced at small loudness, the controller decreases the amount of current, and causes the solenoid-operated key actuator to exert weak force on the associated black/white key. The black/white key is slowly moved, and makes the hammer softly brought into collision with the string. This results in the tone at small loudness.

As described hereinbefore, most of the force is transmitted from the action unit to the hammer through the escape. This means that the key velocity on the entire trajectory from the rest position to the end position is not proportional to the hammer velocity on the entire trajectory from the rest position to the end position. The key velocity at a particular point on the key trajectory is proportional to the final hammer velocity immediately before the collision as taught in Japanese Patent No. 3596015. The particular point is referred to as "reference point".

When a user instructs the controller to reenact a performance, a set of music data codes, which expresses the performance, is loaded into the controller. The controller sequentially processes the music data codes. When the controller finds a music data code for the note-on event presently to occur, the controller specifies the black/white key to be moved, and determines the magnitude of the driving signal to be supplied to the solenoid-operated key actuator associated with the black/white key. The music data code contains a piece of music data expressing the target loudness. However, the target magnitude of the driving signal is not found in the piece of music data. For this reason, the controller determines the target magnitude of the driving signal on the basis of the relation among the key velocity at the reference point, hammer velocity immediately before the collision and loudness of tones.

When the key velocity at the reference point is determined, the controller adjusts the driving signal to the target magnitude which makes the black/white key reach the target key velocity at the reference point, and supplies the driving signal to the solenoid-operated key actuator. Thus, the prior art automatic player reenacts the performance on the piano at fairly good fidelity.

However, the prior art automatic player can not satisfy music fans who have ears for music. Especially, the prior art automatic player is weak in pianissimo. This is the problem inherent in the prior art automatic player.

SUMMARY OF THE INVENTION

It is therefore an important object of the present invention to provide a preliminary data producer, which permits an automatic player to produce tones at high fidelity.

It is another important object of the present invention to provide an automatic player, which includes the preliminary data producer.

It is also an important object of the present invention to provide a musical instrument, which is equipped with the automatic player.

The present inventor contemplated the weak point of the prior art automatic player, and noticed that the resistance against the key motion and individuality of system components had not been taken into account. In other words, the relation among the loudness, key velocity, hammer velocity and magnitude of driving signal had been determined without consideration of the difference in resistance and individualities. The present inventor concluded that the relation was to be determined for individual musical instruments.

To accomplish the object, the present invention proposes to correlate pieces of music data with pieces of control data through experiments on a product of a musical instrument.

In accordance with one aspect of the present invention, there is provided a preliminary data producer correlating pieces of music data expressing an attribute of tones with pieces of control data used in an automatic playing on a musical instrument for producing the tones, and the preliminary data producer comprises a driving system producing pieces of target data expressing target motion of a tone generating system incorporated in the musical instrument on the basis of the pieces of control data and supplying the pieces of target data to actuators of the musical instrument so as to give rise to the target motion of the tone generating system, a data acquisition system monitoring the tone generating system and producing pieces of actual data expressing motion of component parts of the tone generating system and a data processor analyzing the pieces of actual data for the attribute and determining relation between the pieces of control data and the pieces of music data.

In accordance with another aspect of the present invention, there is provided an automatic player for performing a music passage on a musical instrument comprising actuators provided for a tone generating system of the musical instrument and responsive to driving signals representative of pieces of target data so as to give rise to motion of the tone generating system for producing tones, a music data processing system producing the driving signals on the basis of pieces of music data expressing the tones to be produced, and a preliminary data producer correlating pieces of music sub-data incorporated in the pieces of music data and expressing an attribute of the tones with pieces of control data and including a driving system producing pieces of target data expressing target motion of the tone generating system on the basis of the pieces of control data and supplying the pieces of target data to the actuators so as to give rise to the target motion of the tone generating system, a data acquisition system monitoring the tone generating system and producing pieces of actual data expressing motion of component parts of the tone generating system and a data processor analyzing the pieces of actual data for the attribute and determining relation between the pieces of control data and the pieces of music sub-data.

In accordance with yet another aspect of the present invention, there is provided a musical instrument for producing tones comprising a tone generating system producing the tones and including component parts participating in generation of the tones, an automatic player actuating the tone generating system without any fingering of a human player and including actuators provided for the tone generating system and responsive to driving signals representative of pieces of target data so as to give rise to motion of the tone generating system for producing the tones and a music data processing system producing the driving signals on the basis of pieces of music data expressing the tones to be produced, and a preliminary data producer correlating pieces of music sub-data incorporated in the pieces of music data and expressing an attribute of the tones with pieces of control data and including a driving system producing pieces of target data expressing target motion of the tone generating system on the basis of the pieces of control data and supplying the pieces of the target data to the actuators so as to give rise to the target motion of the tone generating system, a data acquisition system monitoring the tone generating system and producing pieces of actual data expressing motion of component parts of the tone generating system and a data processor analyzing the pieces of actual data for the attribute and determining relation between the pieces of control data and the pieces of music sub-data.

BRIEF DESCRIPTION OF THE DRAWINGS

The features and advantages of the-preliminary data producer, automatic player and musical instrument will be more clearly understood from the following description taken in conjunction with the accompanying drawings, in which.

DESCRIPTION OF THE PREFERRED EMBODIMENTS

Figure 1:
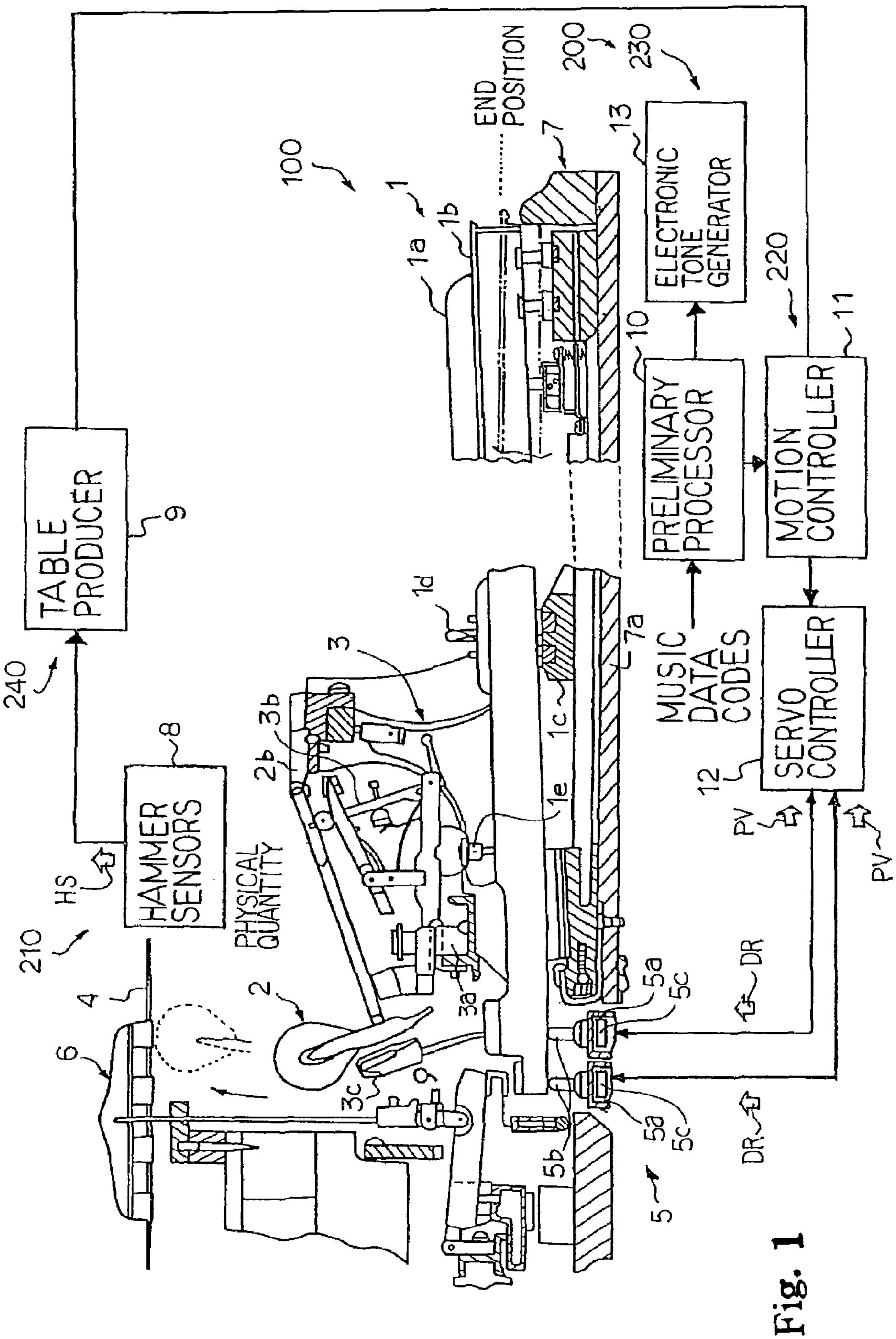
FIG. 1 is a cross sectional side view showing the structure of an automatic player piano according to the present invention.

A musical instrument embodying the present invention largely comprises a tone generating system, an automatic player and a preliminary data producer. Another musical instrument may be retrofitted to the musical instrument through installation of the automatic player and preliminary data producer, and the preliminary data producer may be offered to users separately from the automatic player musical instrument, which includes the musical instrument and automatic player.

A human player or the automatic player actuates the tone generating system for producing tones. When the human player or automatic player gives rise to motion of the tone generating system, component parts are selectively moved so as to participate in the generation of the tones, and the motion of component parts has strong influence on an attribute of the tones. For example, high-speed motion results in large magnitude of tones, and low-speed motion results in small magnitude of tones. The tone generating system is different in constitution between the musical instrument and another sort of musical instrument. A keyboard, action units, hammers and strings constitute the tone generating system in a piano. However, a keyboard valves and pipes form the tone generating system in an organ.

The automatic player includes actuators and music data processing system. The actuators are provided for the tone generating system, and give rise to the motion of the tone generating system without any fingering of the human player. When a user instructs the automatic player to produce tones along a music passage, a set of pieces of music data, which expresses the music passage, is loaded into the music data processing system. The music data processing system produces pieces of target data expressing target motion of the tone generating system, and supplies driving signals representative of the pieces of target data to the actuators. The actuators are driven to realize the target motion of the tone generating system, and the target motion results in the tones produced through the tone generating system. Since the pieces of target data are produced on the basis of pieces of control data, it is important exactly to define relation between the pieces of control data and pieces of music sub-data expressing the attribute of tones.

The preliminary data producer previously determines the relation between the pieces of music sub-data and the pieces of control data, and includes a driving system, a data acquisition system and a data processor. The driving system is provided in association with the tone generating system, and responsive to driving signals representative of pieces of target data so as to be actuated. The driving system gives rise to target motion of the tone generating system in the actuated state. The data processor produces the driving signal on the basis of the pieces of control data, and supplies the driving signal to the driving system. The data acquisition system is provided in association with the component parts of the tone generating system, and produces pieces of actual data expressing motion of the component parts.

When the preliminary data producer starts to determine relation between the pieces of music sub-data and the pieces of control data, the data processor causes the driving system to give rise to the target motion, and gathers the pieces of actual data expressing the motion of the component parts so as to determine the relation. Since the component parts participate in the generation of the tones, the motion of component parts deeply concerns the attribute of the tones.

In detail, the driving system produces determines the pieces of target data on the basis of the pieces of control data, and produces the driving signals expressing the pieces of target data. The driving signals are supplied from the driving system to the actuators. The actuators are actuated, and give rise to the target motion of the tone generating system. The component parts are moved in the target motion, and the data acquisition system produces the pieces of actual data. The pieces of actual data are supplied to the data processor, and the data processor determines the relation between the pieces of control data and the pieces of music sub-data. Although the tone generator and automatic player have respective individuality, the individuality of tone generator and the individuality of automatic player make the motion of component parts delicately different from those observed in corresponding component parts of another tone generator associated with another automatic player, and the data processor determines the relation on the basis of the pieces of actual data expressing the motion of component parts. Thus, the preliminary data producer determines the relation between the pieces of control data and the pieces of music sub-data on the influence of the individuality.

While the automatic player is performing a music passage expressed by pieces of music data, the music data processing system exactly determines the attribute of tones to be produced on the basis of the relation between the pieces of control data and the pieces of music sub-data, and makes the actuators give rise to the target motion, which is expected to result in the tones with the attribute to be imparted thereto.

In the following description, term "front" is indicative of a position closer to a pianist, who is sitting on a stool for fingering, than a position modified with term "rear". A line drawn between a front point and a corresponding rear point extends in a "fore-and-aft direction", and the fore-and-aft direction crosses a "lateral" direction at right angle. A vertical direction is normal to a plane defined by the fore-and-aft direction and lateral direction.

First Embodiment

Referring to FIG. 1 of the drawings, the automatic player piano embodying the present invention largely comprises an acoustic piano 100 and an electric system 200. The acoustic piano 100 is responsive to fingering of a player so as to produce acoustic piano tones, and the electric system 200 is installed in the acoustic piano 100. The electric system 200 serves as at least a preliminary data producer 210, an automatic player 220 and an electronic player 230. The electric system 200 may further serve as a music recorder.

The preliminary data producer 210 measures final hammer velocity, which means hammer velocity immediately before collision for producing the acoustic piano tones, at plural values of reference key velocity, and determines relation among the loudness of tones and the reference key velocity. The reference key velocity is the key velocity at the reference points on key trajectories. The term "reference point" was described in conjunction with the prior art automatic player disclosed in Japanese Patent No. 3596015.

The automatic player 220 reenacts a performance expressed by a set of music data codes on the acoustic piano 100. In this instance, the music data codes are produced in the formats defined in the MIDI (Musical Instrument Digital Interface) protocols. On the other hand, the electronic player 230 is also responsive to the music data codes so as to produce electronic tones.

Acoustic Piano

The acoustic piano 100 includes a keyboard 1, hammers 2, action units 3, strings 4, dampers 6 and a piano cabinet 7, and black keys 1*a* and white keys 1*b* are laid on the well-known pattern in the keyboard 1. In this instance, eighty-eight black and white keys 1*a* and 1*b* are incorporated in the keyboard 1. The pitch names of the scale are respectively assigned to the black and white keys 1*a* and 1*b*, and are expressed by key numbers from 1 to 88. Although the acoustic piano 100 further includes a pedal system as similar to a standard grand piano, the pedal system is not shown in FIG. 1.

A key bed 7*a* defines the lower extent of the piano cabinet 7, and legs (not shown) keep the key bed 7*a* spaced over a floor. The piano cabinet 7 has a hollow space, and the hammers 2, action units 3, strings 4 and dampers 6 are accommodated in the hollow space. The keyboard 1 is mounted on a front portion of the key bed 7*a*, and is exposed to a human player for fingering.

A balance rail 1*c* is provided over the key bed 7*a*, and extends in the lateral direction. Balance pins Id project from the balance rail 1*c*, and offer fulcrums to the black and white keys 1*a*/1*b*. The black and white keys 1*a* and 1*b* are capable of pitching up and down with respect to the balance rail 1*c*. While any force is not being exerted on the front portions of the black and white keys 1*a*/1*b*, the black and white keys 1*a* and 1*b* are rest in respective rest positions, and the keystroke at the rest positions is expressed as zero. When a pianist exerts force on the front portions of the black and white keys 1*a* and 1*b*, the black and white keys 1*a* and 1*b* starts to travel on respective key trajectories. The black and white keys 1 and 1*b* reach end positions at the end of the travel, and stop at the end positions. One of the white keys 1*b* at the end position is drawn by dots-and-dash lines in FIG. 1.

The rear portions of the black and white keys 1*a* and 1*b* are respectively connected to the action units 3 through capstan screws 1*e*, and are rotatable about whippen flanges 3*a*. The strings 4 are stretched over the hammers 2, respectively, and are designed to produce the acoustic piano tones at respective pitches the names of which are same as those assigned to the associated black and white keys 1*a* and 1*b*.

When the jacks 3*b* escape from the hammers 2, the hammers 2 start free rotation toward the strings 4. The hammers 2 are brought into collision with the strings 4 at the end of the free rotation so as to give rise to vibrations of the strings 4.

Back checks 3*c* project from the rearmost positions of the black and white keys 1*a* and 1*b*, and the hammers 2 are softly landed on the back checks 3*c* after rebounding on the strings 4.

The dampers 6 upwardly extend from the space over the rearmost portions of the black and white keys 1*a* and 1*b*, and are spaced from and brought into contact with the strings 4 depending upon current positions of the associated black and white keys 1*a* and 1*b*. While the black and white keys 1*a* and 1*b* are resting in the rest positions, the rearmost portions are spaced from the dampers 6, and the dampers 6 are held in contact with the strings 4, respectively. In this situation, the dampers 6 prevent the strings 4 from the vibrations, respectively. When the front portions of the black and white keys 1*a* and 1*b* are depressed, the black and white keys 1*a* and 1*b* start to travel on the trajectories from the rest positions toward the end positions. The rearmost portions of black and white keys 1*a* and 1*b* are bought into contact with the dampers 6 on the way to the end positions, and push the dampers 6 upwardly. The dampers 6 get spaced from the strings 4, and permit the strings 4 to vibrate.

A human player is assumed to depress a white key 1*b*, the white key 1*b* starts to travel on the forward trajectory from the rest position to the end position. The white key 1*b* firstly pushes up the damper 6, and makes the string 4 ready for vibrations. The white key 1*b* on the forward trajectory causes the action unit 3 to rotate, and causes the jack 3*b* to escape from the hammer 2 at predetermined timing in the rotation. When the jack 3*b* escapes from the hammer 2, the hammer 2 starts the free rotation toward the string 4. The hammer 2 is bought into collision with the string 4 at the end of the free rotation, and gives rise to the vibrations of the string 4. The acoustic piano tone is produced at the predetermined pitch through the vibrations of the string 4.

Upon collision with the string 4, the hammer 2 rebounds on the string 4, and is dropped downwardly. The white key 1*b* has already reached the end position so that the back check 3*c* is upwardly lifted. The hammer 2 is surely captured by the back check 3*c* without rebound thereon so that the string 4 is prevented from double strike.

When the human player releases the white key 1*b*, the white key 1*b* starts to travel on the backward trajectory from the end position toward the rest position. The rearmost portion of the white key 1*b* is sunk, and permits the damper 6 to move downwardly. The damper 6 is brought into contact with the string 4 before the white key 1*b* reaches the rest position, and makes the acoustic piano tone decayed.

Electric System

The electric system 200 includes solenoid-operated key actuators 5, hammer sensors 8 and a controller 240. The solenoid-operated key actuators 5, hammer sensors 8 and controller 240 form in combination the preliminary data producer 210. The preliminary data producer 210 shares the controller 240 and solenoid-operated actuators 5 with the automatic player 220, and the controller 240 with the electronic player 230. Different computer programs run on the controller 240 for the preliminary data producer 210, automatic player 220 and electronic player 230. Thus, the preliminary data producer 210, automatic player 220 and electronic player 230 are realized by the aid of software.

The solenoid-operated key actuators 5 are installed under the rear portions of the black and white keys 1*a* and 1*b*. A slot is formed in the key bed 7*a*, and laterally extends under the rear portions of the black and white keys 1*a* and 1*b*. Each of the solenoid-operated key actuators 5 includes a solenoid 5*a*, a plunger 5*b* and a plunger sensor 5*c*. While electric current flows through the solenoid 5*a*, a magnetic field is created, and magnetic force is exerted on the plunger 5*b* in such a manner as to project upwardly. On the other hand, when the electric current is removed, the plunger 5*b* is retracted into the solenoid 5*a*. The electric current is supplied from the controller 240 to the solenoid 5*a* in the form of a driving pulse signal DR. The plunger sensor 5*c* monitors the plunger 5*b*, and produces a plunger velocity signal PV representative of current plunger velocity. In this instance, a moving magnet type sensor is employed as the plunger sensor 5*c*. The plunger velocity signal PV is supplied to the controller 240.

The solenoid-operated key actuators 5 form an array in a staggered fashion, and the array of solenoid-operated key actuators 5 is hung from the key bed 7*a* in such a manner that the plungers 5*b* are found in the proximity of the lower surfaces of the associated black and white keys 1*a* and 1*b*.

The hammer sensors 8 are of the type converting physical quantity expressing the hammer motion to an electric signal. In this instance, the hammer sensors 8 convert current hammer position to the hammer position signal HP, and each of the hammer sensors 8 includes an optical modulator attached to the associated hammer 2 and a pair of sensor heads throwing a light beam across the trajectory of the optical modulator. The hammer trajectory from the rest position and the end position is fallen within the detectable range of each hammer sensor 8. The hammer sensor disclosed in Japanese Patent Application laid-open No. 2001-175262 is available for the automatic player piano of the present invention.

Figure 2:
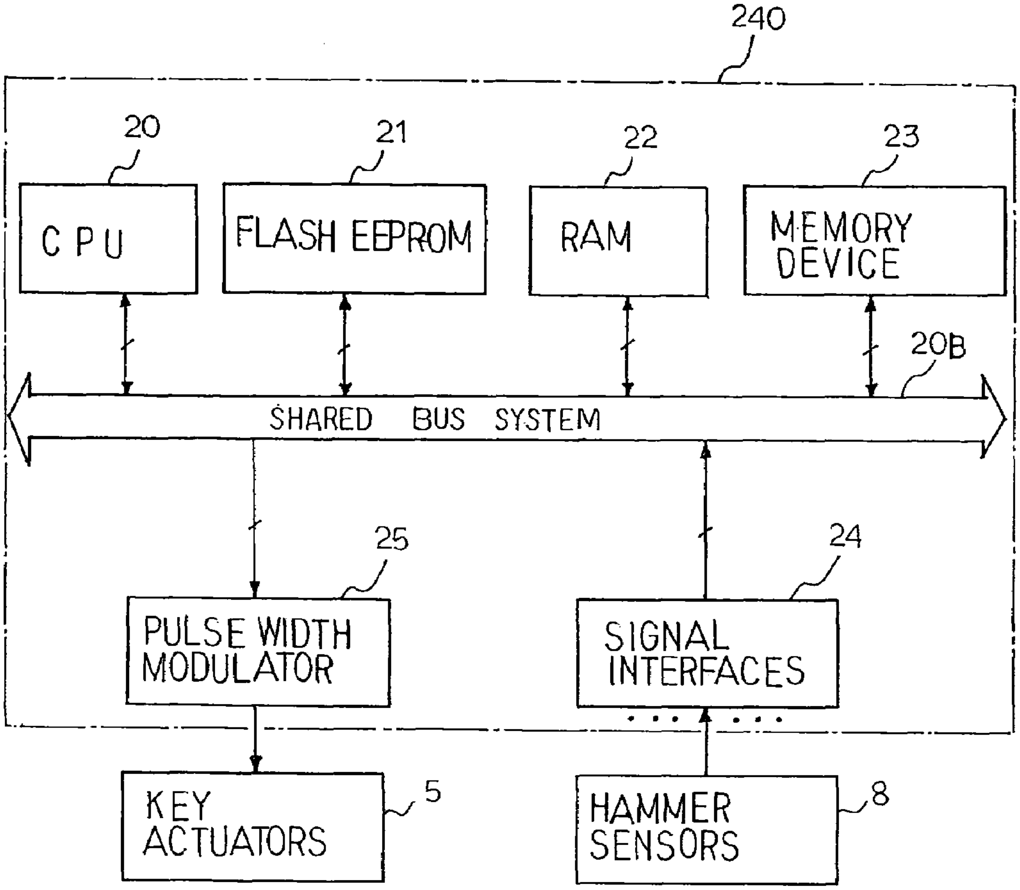
FIG. 2 is a block diagram showing the system configuration of a controller incorporated in the automatic player piano.

Turning to FIG. 2 of the drawings, the controller 240 includes a central processing unit 20, which is abbreviated as "CPU", a read only memory 21, which is abbreviated as "FLASH EEPROM", a random access memory 22, which is abbreviated as "RAM" and a shared bus system 20B. The central processing unit 20, read only memory 21 and random access memory 22 are connected to the shared bus system 20B so that the central processing unit 20 can access instruction codes and data codes stored in the read only memory 21 and random access memory 22 through the shared bus system 20B.

The instruction codes, which form a computer program, and data codes expressing constants, thresholds, individual data and so forth, are stored in the read only memory 21. The read only memory 21 is implemented by a semiconductor flash-type electrically erasable and programmable read only memory, and is preferable to a semiconductor mask read only memory, because users can update the computer program and individual data.

The central processing unit 20 is the origin of data processing capability of the controller 240. When the electric system 200 is powered on, the computer program starts to run on the central processing unit 20. Various tasks are to be achieved for user's instructions, and the central processing unit 20 executes the instruction codes in order to achieve the tasks. While the central processing unit 20 is executing the tasks, the random access memory 22 offers a working memory area to the central processing unit 20, and flags, registers, software timers and tables are created in the working memory area.

The computer program is broken down into a main routine program and subroutine programs for the preliminary data producer 210, automatic player 220 and electronic player 230. When a user turns on a power switch for the electric system 200, the main routine program starts to run on the central processing unit 20, and carries out a system initialization. Upon completion of the system initialization, the central processing unit 20 starts to check a man-machine interface to see whether or not a user gives an instruction.

One of the subroutine programs starts to run on the central processing unit 20 at every timer interruption for data fetch, and is shared between the preliminary data producer 210, automatic player 220 and electronic player 230. In other words, the preliminary data processor 210, automatic player 220 and electronic player 230 obtain pieces of data through the subroutine program for the data fetch.

Another subroutine program is assigned to the preliminary data producer 210, and the main routine program starts periodically to branch the subroutine program for the tasks assigned to the preliminary data producer 210 upon reception of the user's instruction. The subroutine program for the preliminary data producer 210 will be hereinlater described in detail.

Yet another subroutine program is assigned to the automatic player 220. The function of the automatic player 220 is broken down into a preliminary processor 10, a motion controller 11 and a servo controller 12. When a user instructs the electric system 200 to reenact a performance, a set of music data codes expressing the performance is transferred to the random access memory 22, and the main routine program starts periodically to branch the subroutine program for the automatic player 220. The preliminary processor 10 searches the random access memory 22 to see whether or not any music data code or codes express a tone or tones to be immediately reproduced. While the answer is given negative, the preliminary processor 10 repeats the search for the music data code or codes expressing the tone or tone to be immediately produced.

When the preliminary processor 10 finds a music data code to be processed, the preliminary processor 10 produces a series of modified music data codes. As described hereinbefore, the loudness is proportional to the final hammer velocity, and the key velocity at the reference point has the strong influence on the final hammer velocity. The series of modified music data codes is produced in the manner defined in the MIDI protocols, and expresses a reference key trajectory together with the key number assigned to the black/white key 1*a*/1*b* to be actuated. If a black/white key 1*a*/1*b* travels on the reference key trajectory, the black/white key 1*a*/1*b* reaches a target value of the key velocity at the reference point. Thus, the reference key trajectory is defined as "a series of values of physical quantity varied with time". In this instance, the physical quantity is the key velocity. The modified music data codes are supplied from the preliminary processor 10 to the motion controller 11 at regular time intervals.

The control is handed from the preliminary processor 10 to the motion controller 11. The motion controller 11 individualizes the series of values of the velocity expressing the loudness of the tone to be produced in the modified music data codes, and produces a series of target key velocity expressing an individual reference key trajectory. The function of the motion controller 11 is hereinlater described in more detail.

When the motion controller 11 determines the individual reference key trajectory, the servo controller 12 starts to cooperate with the motion controller 11. The motion controller 11 periodically supplies the values of target key velocity expressing the individual reference key trajectory to the servo controller 12. When each of the values of target key velocity is handed from the motion controller 12 to the servo controller 12, the motion controller 12 determines a target key position through an integration on the values of target key velocity, and further determines an actual key position through an integration on values of actual plunger velocity represented by the plunger velocity signal PV. The motion controller 12 determines a position different between the actual key position and the target key position and a velocity difference between the actual key velocity and the target key velocity.

If neither position difference nor velocity difference is found, the servo controller 12 keeps the driving pulse signal DR at the present duty ratio. On the other hand, when either of or both of the position difference and velocity difference are found, the servo controller 12 determines a new value of duty ratio, with which the position difference and/or velocity difference are minimized, and adjusts the driving pulse signal DR at the new value. Thus, the servo controller 12 cooperates with the motion controller 11 so as to force the black/white key 1*a*/1*b* to travel on the reference key trajectory.

Still another subroutine program is assigned to the electronic player 230. When a user instructs the electric system 200 to perform a piece of music through electronic tones, the main routine program starts periodically to branch the subroutine program for the electronic player 230. The central processing unit 20 transfers a set of music data codes expressing the piece of music to the random access memory 22. The central processing unit 10 searches the random access memory 22 for music data codes expressing the electronic tones to be immediately produced as the preliminary data processor 10 (see FIG. 1). When the central processing unit 20 finds a music data code or codes expressing the electronic tones to be immediately produced, the preliminary data processor 10 transfers the music data codes to an electronic tone generator 13. Pieces of waveform data are stored in a waveform memory in the electronic tone generator 13, and the pieces of waveform data expressing the tone or tones are successively read out from the waveform memory, and an audio signal is formed from the pieces of waveform data.

Turning back to FIG. 2, the controller 240 further includes a memory device 23, signal interfaces 24 and a pulse width modulator 25. These system components 23, 24 and 25 are also connected to the shared bus system 20B, and the central processing unit 20 can communicate with the memory device 23, signal interface 24 and pulse width modulator 25. Though not shown in FIG. 2, a manipulating panel is connected to the shared bus system 20B, and switches, keys, indicators and a display window are arranged on the manipulating panel. The manipulating panel serves as the man-machine interface. Users give instructions through the manipulating panel, and are informed of the current status through the indicators and display window. The central processing unit 20 may produce prompt messages on the display window.

The signal interface 24 includes analog-to-digital converters, and the hammer sensors 8 are connected to the analog-to-digital interface 24. The hammer position signals 8 are periodically sampled, and the discrete values are converted to data codes expressing the discrete values. The data codes are periodically fetched by the central processing unit 20 through the subroutine program for the data fetch, and are memorized in a certain data storage area in the random access memory 22. Other signals sources such as, for example, key sensors and an external data source are connected to the signal interface 24. The external data source may supply sets of music data codes and updated computer programs to the controller 240 through an extranet.

The memory device 23 has dada holding capability, which is much larger than that of the random access memory 22 and read only memory 21, and is, by way of example, implemented by a hard disk driver, a flexible disk driver such as a floppy disk driver, the term "floppy disk" of which is a trademark, a compact disk driver for a CD-ROM (Compact Disk Read Only Memory) and a CD-RAM (Compact Disk Random Access Memory), an MO (Magneto-Optical) disk, a DVD (Digital Versatile Disk), a zip disk or a semiconductor memory board. A set of music codes may be transferred from the memory device 23 to the random access memory 22 for the automatic playing.

The pulse width modulator 25 is responsive to a control data code, which is supplied from the central processing unit 20, so as to adjust the driving pulse signal DR to a target value of the duty ratio. The driving pulse signals DR are selectively supplied from the pulse width modulator 25 to the solenoid-operated key actuators 5.

As described hereinbefore, the loudness of tones to be produced are expressed as "velocity" in the music data codes, and the controller 240 controls the key velocity at the reference points through the servo control for the loudness of tones produced through the vibrations of the strings 4. Thus, the velocity is to be correlated with the key velocity in the controller 240. In the following description, the "velocity" stored in the music data codes is referred to as "MIDI velocity" in order to discriminate the term "key velocity" on the key trajectories.

Figures 3, 4, 7:
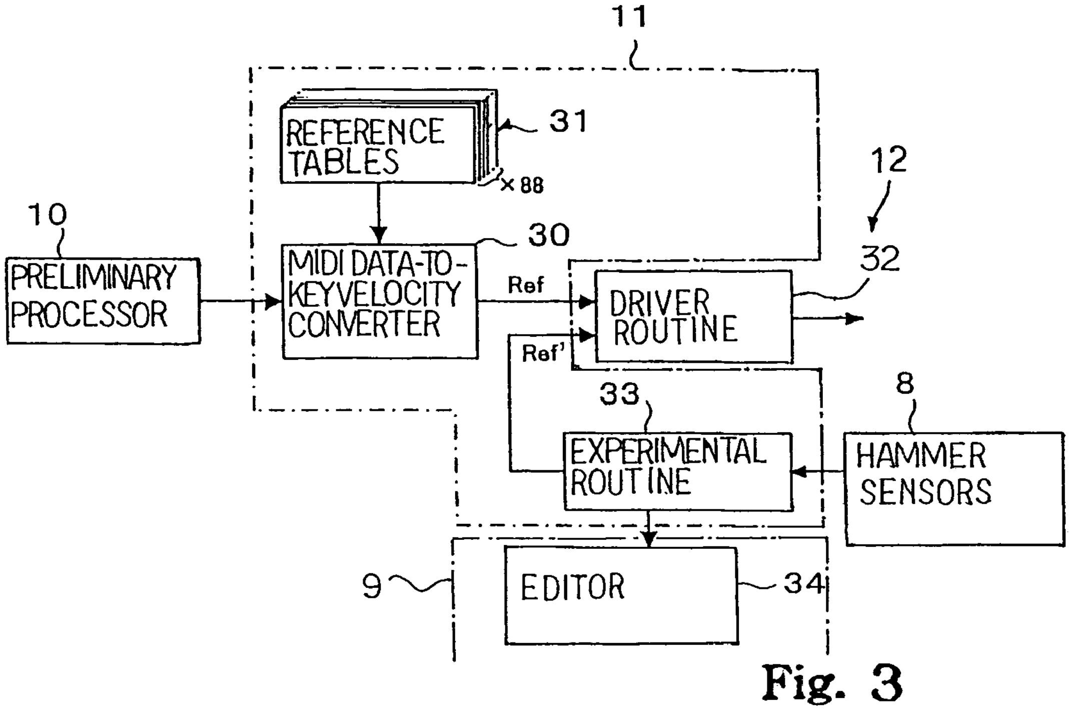
FIG. 3 is a block diagram showing the functions of a preliminary data processor and functions of an automatic player.
FIG. 4 is a view showing a series of modified music data codes.
FIG. 7 is a view showing values of key velocity applied to the black and white keys.

FIG. 3 shows the functions of the automatic player 220 together with the functions of the preliminary data processor 210 in more detail. The function of the motion controller 11 is broken down into a MIDI data-to-key velocity converter 30 accompanied with reference tables 31 and an experimental routine 33. Eighty-eight reference tables 31 are respectively assigned to the eighty-eight keys 1*a*/1*b*, and have been prepared by the preliminary data producer 210 for the automatic player piano. In other words, the eighty-eight reference tables 31 may not be appropriate to other automatic player pianos.

Relation between the MIDI velocity and the target key velocity is stored in the reference tables 31. FIG. 4 shows a series of modified music data codes for a black/white key 1*a*/1*b*. Each of the modified music data codes contains a piece of time data t, a piece of velocity data expressing a target value of the MIDI velocity V at the time t and a piece of key data expressing the key number Kn assigned to the black/white key 1*a*/1*b* to be actuated. The series of values of the MIDI velocity V expresses the reference key trajectory.

When a modified music data code reaches the MIDI data-to-key velocity converter 30, the MIDI data-to-key velocity converter 30 determines the key number Kn assigned to the black/white key 1*a*/1*b* to be actuated and a value of the MIDI velocity V, and accesses one of the reference tables 31 labeled with the key number Kn with the value of MIDI velocity V. The MIDI data-to-key velocity converter 30 reads out the value of the target key velocity Ref corresponding to the value of the MIDI velocity V from the reference table 31 labeled with the key number, and the target key velocity Ref is supplied to a driver routine 32, which forms a part of the servo controller 12. The series of values of the target key velocity expresses the individual reference key trajectory on which the black/white key 1*a*/1*b* is forced to travel.

Behavior of Preliminary Data Producer

As described hereinbefore, the preliminary data producer 210 includes the solenoid-operated key actuators 5, hammer sensors 8 and controller 240. The function of the controller 240 for the preliminary data producer 210 includes the motion controller 11 and a table producer 9, the function of which in turns includes an editor 34 as shown in FIG. 3.

When a user or a factory worker instructs the preliminary data producer 210 to prepare the reference tables 31 through the manipulating panel (not shown), the experimental routine 33 starts to supply series of values of key velocity Ref' representative of test key trajectories to the driver routine 32. If a black/white key 1*a*/1*b* successively travels on the plural test key trajectories, the black/white key 1*a*/1*b* passes the reference point at different values of key velocity, and, accordingly, the associated hammer 2 is brought into collision with the string 4 at different values of the final hammer velocity. In this instance, the preliminary data producer 210 carries out the experiments on the assumption that the black and white keys 1*a* and 1*b* take the uniform motion on the test key trajectories.

The hammer sensor 8 varies the magnitude of the hammer position signal HS depending upon the current hammer position, and the analog-to-digital converter of the signal interface 24 converts the discrete values on the hammer position signal HS to a series of experimental data codes expressing the current hammer position. The experimental routine 33 determines the final hammer velocity through the data processing on the experimental data codes, and converts the final hammer velocity to the MIDI velocity V. The experimental routine 33 repeats the above-described experimental sequence at predetermined values of the key velocity for each of the black and white keys 1*a*/1*b*. When the experimental routine 33 determines the values of final hammer velocity at different values of the key velocity, the experimental routine 33 repeats the experiment for each of the eighty-seven black and white keys 1*a*/1*b*. Thus, the key velocity, which is to be measured at the reference point on the reference key trajectory, is correlated with the MIDI velocity V through the experiments.

Figure 5:
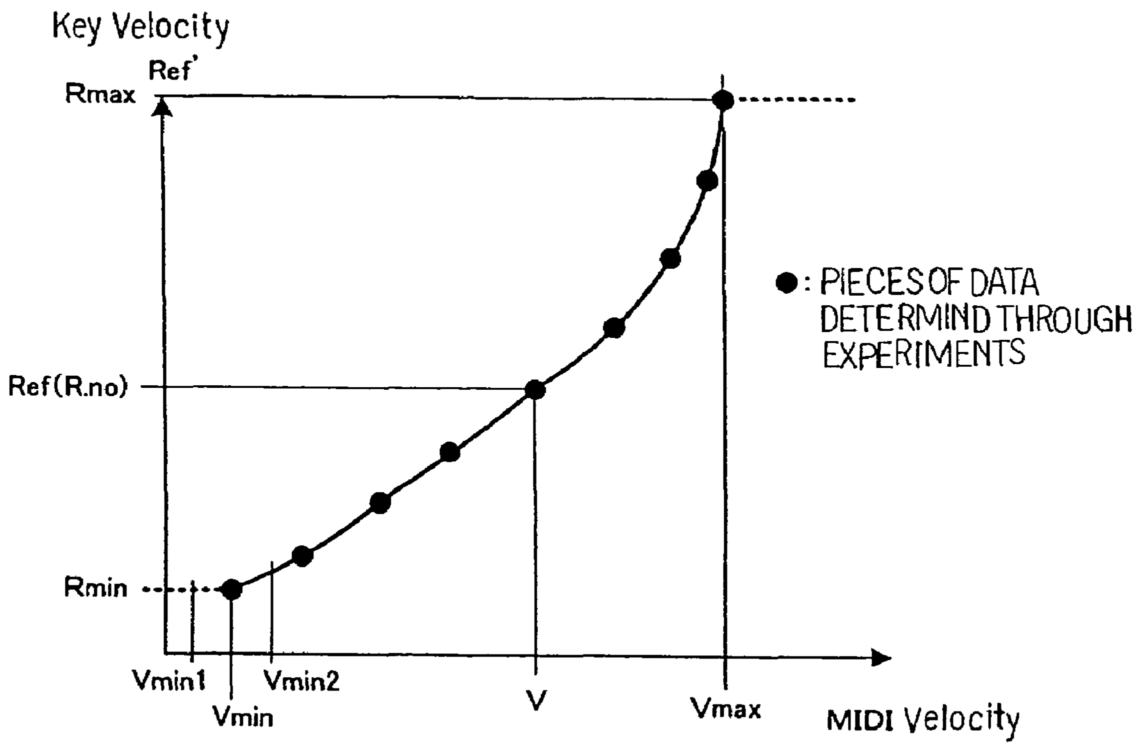
FIG. 5 is a graph showing the contents of a reference table prepared by the preliminary data producer.

The relation between the key velocity and the MIDI velocity V is transferred to the editor 34, and the editor 34 produces the reference tables 31. FIG. 5 shows the relation memorized in one of the reference tables 31, and dots stand for the pieces of data determined through the experiments. In FIG. 5, Kn stands for the key number assigned to each of the black and white keys 1*a*/1*b*, and is varied from 1 to 88. R.no. is indicative of the number assigned to each of the pieces of test data expressing the target values of the key velocity at the reference point. The lowest key velocity is expressed as Rmin, and Rmax expresses the highest key velocity. The target values of the key velocity are fallen within the range from the lowest key velocity Rmin and the highest key velocity Rmax. In this instance, nine target values are given to the experimental routine 33, and are expressed as R.no.1, R.no.2, . . . and R.no.9. In other words, the experiment is repeated nine times for each of the eighty-eight black and white keys 1*a* and 1*b*, and the key velocity is changed from R.no.1 to R.no.9 through R.no.2, R.no.3, . . . and R.no.8. The key velocity at R.no. 1, . . . and R.no.9 is simply expressed as Ref1, . . . and Ref9. The key velocity Ref1 is equivalent to the lowest key velocity Rmin. The least value of the MIDI velocity is expressed as Vmin, and is to be corresponding to the key velocity Rmin. Two thresholds Vmin1 and Vmin2 are stored in the read only memory 21 for the MIDI velocity Vmin. The threshold Vmin 2 is slightly larger in value than the threshold Vmin.

Figure 6A:
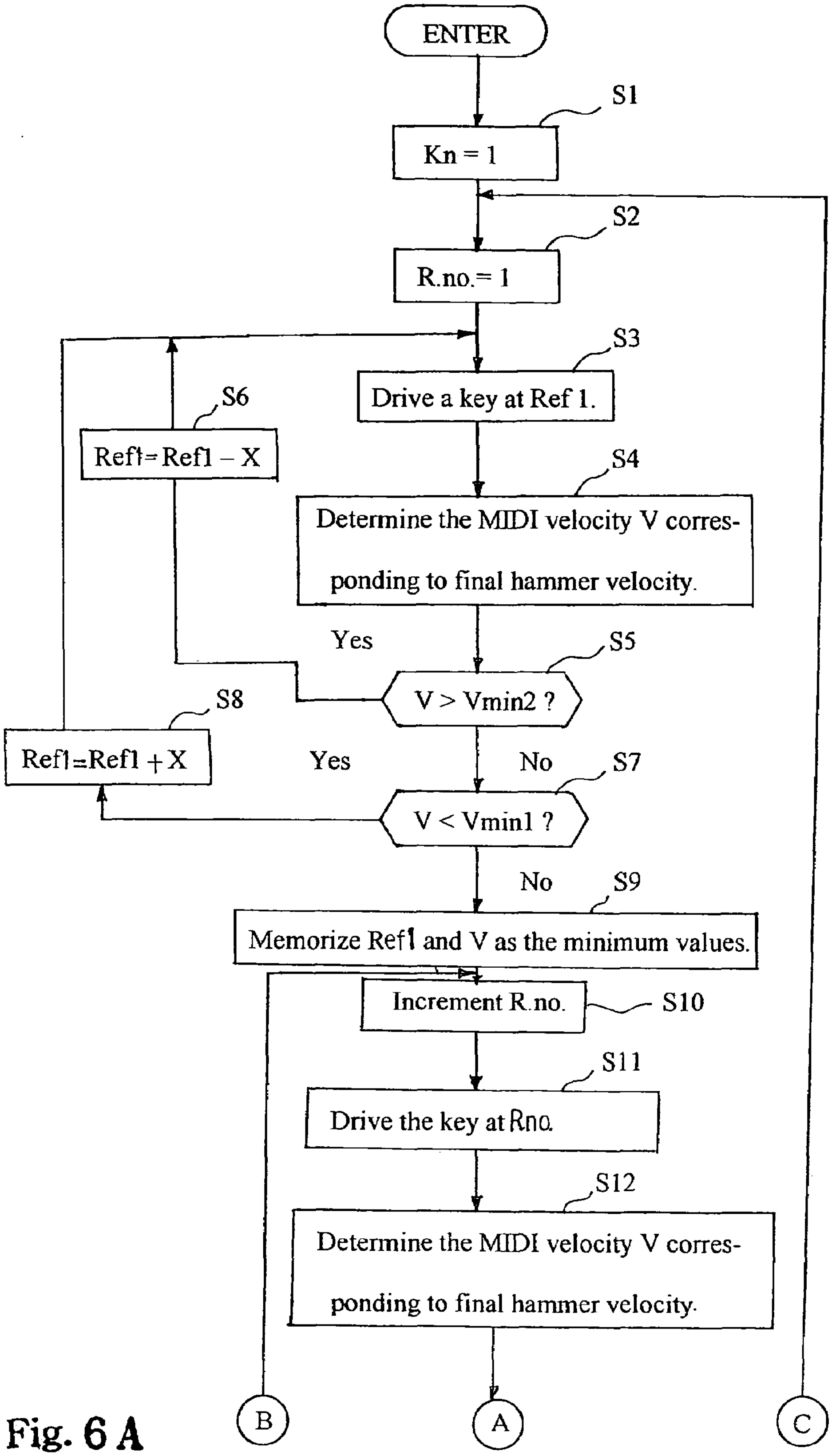
FIGS. 6A and 6B are flowcharts showing a subroutine program for the preliminary data producer.
Figure 6B:
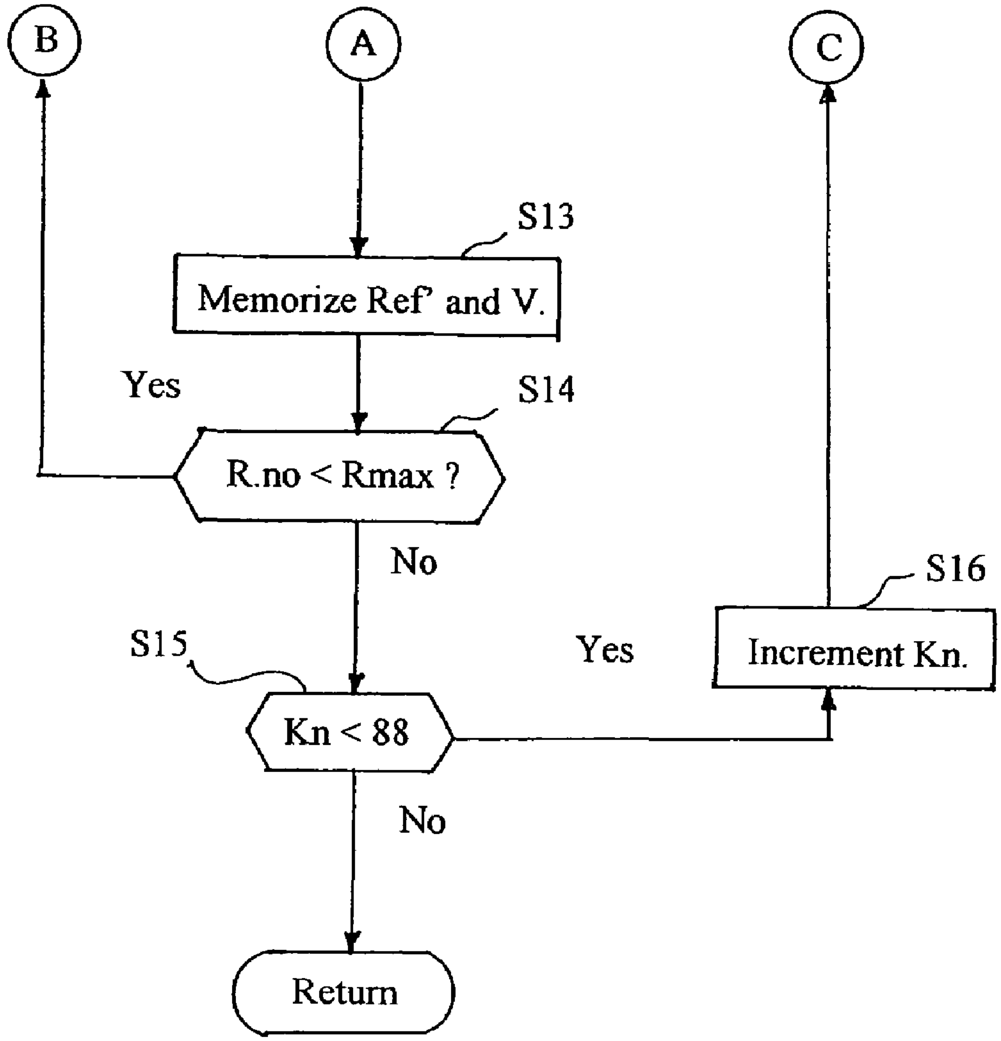
Figure 8:
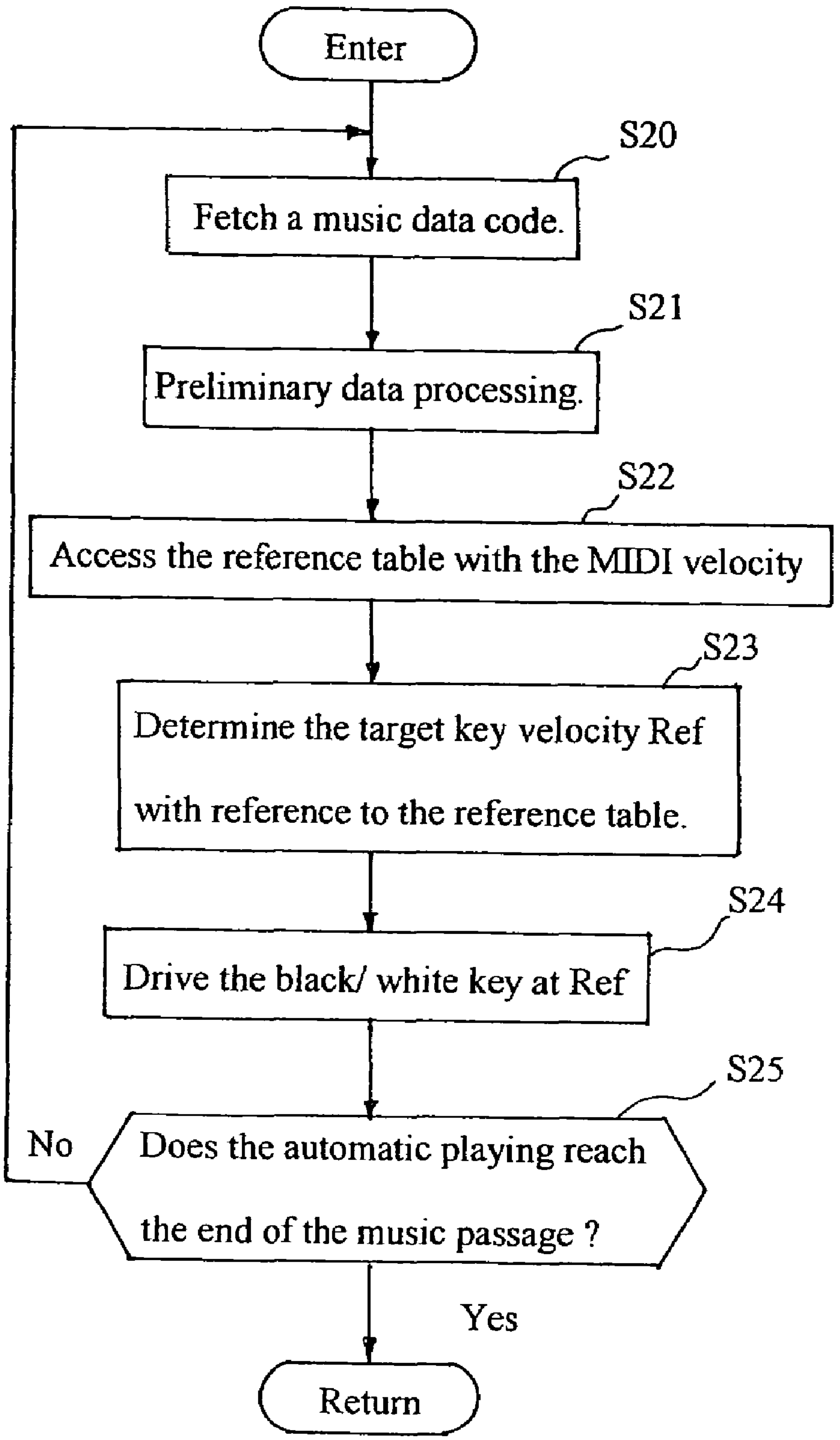
FIG. 8 is a flowchart showing a subroutine program for the automatic player.

Description is hereinafter made on the subroutine program for the preliminary data producer 210 with reference to FIGS. 6A and 6B. A user is assumed to instruct the electric system 200 to prepare the reference tables 31. The main routine program starts periodically to branch to the subroutine program for the preliminary data producer 210. The central processing unit 20 firstly sets the register at "1" in order to represent the black/white key 1*a*/1*b* assigned the key number "1" as by step S1, and sets the register representative of the number R.no. at "1" as by step S2.

Subsequently, the central processing unit 20 determines the test key trajectory for the key velocity Ref1, and drives the black/white key 1*a*/1*b* assigned the key number "1" to transit the reference point at the key velocity Ref1 as by step S3. The central processing unit 20 periodically instructs the pulse width modulator 25 to adjust the driving signal DR to the duty ratio equivalent to the proper value Ref' for the servo control, and the black/white key 1$a$/1$b$ is forced to pass the reference point on the test key trajectory at R.no.

While the black/white key 1$a$/1$b$ is traveling on the test key trajectory, the hammer sensor 8 varies the magnitude of the hammer position signal HS, and the central processing unit 20 accumulates the data codes expressing the discrete values on the hammer position signal HS in the predetermined memory area in the random access memory 22. Upon completion of the data accumulation, the central processing unit 20 determines the final hammer velocity and the corresponding value of the MIDI velocity as by step S4.

Subsequently, the central processing unit 20 compares the value V of MIDI velocity with the threshold value Vmin2 to see whether or not the value V is greater than the threshold value Vmin2 as by step S4.

If the value V is greater than the threshold value Vmin2, the answer at step S5 is given affirmative "Yes". With the positive answer "Yes", the central processing unit 20 decrements the key velocity Ref1 by small value X as by step S6, and returns to step S3. The central processing unit 20 drives the black/white key 1$a$/1$b$ at the new value of key velocity, i.e., Ref1=Ref1−X". While the answer at step S5 is being given affirmative, the central processing unit 20 reiterates the loop consisting of steps S3, S4, S5 and S6, and the experiment is repeated at the newly decremented value Rref1.

When the value of MIDI velocity V becomes less than the threshold value Vmin2, the answer at step S5 is given negative "No", and the central processing unit 20 proceeds to step S7. The central processing unit 20 compares the value of MIDI velocity V with the other threshold Vmin1 to see whether or not the value V is less than the threshold Vmin1 at step S7. If the value V of MIDI velocity is less than the threshold Vmin1, the previous subtraction at step S6 makes the key velocity Ref1 too small in value. In this situation, the hammer 2 causes the string 4 to vibrate faintly, or does not reach the string 4. In this situation, the answer at step S7 is given affirmative "Yes".

With the positive answer at step S7, the central processing unit 20 adds a small value X to the value of key velocity Ref1 as by step S8, and returns to step S3. Thus, the central processing unit 20 makes the value of MIDI velocity V fallen within the range between the threshold Vmin1 and the other threshold Vmin2 through the execution at steps S3 to S8.

When the value of MIDI velocity V is fallen within the target range, the answers at both steps S5 and S7 are given negative "No". Then, the central processing unit 20 memorizes the value of key velocity Ref1 and the value of MIDI velocity V in a predetermined memory area in the random access memory 22 as by step S9. Thus, the central processing unit 20 firstly correlates the minimum value of MIDI velocity Vmin with the lowest key velocity Rmin.

Subsequently, the central processing unit 20 increment the number R.no. assigned to the key velocity as by step S10, and drives the black/white key 1$a$/1$b$ on the test key trajectory in such a manner as to pass the reference point at the key velocity R.no. as by step S11.

While the hammer 2 is traveling on the hammer trajectory, the hammer sensor 8 varies the magnitude of the hammer position signal HS, and the discrete values on the hammer position signal HS are accumulated in the memory area in the random access memory 22. The central processing unit 20 determines a value of MIDI velocity V corresponding to the final hammer velocity as by step S12, and memorizes the key velocity R.no. and MIDI velocity V in the memory area in the random access memory 22 as by step S13.

Subsequently, the central processing unit 20 checks the register to see whether or not the key velocity R(no.) is less than the highest key velocity Rmax as by step S14. While the central processing unit 20 is carrying out the experiment at the key velocity Ref2 to the key velocity Ref8, the answer at step S14 is given affirmative, and the central processing unit 20 returns to step S10. Thus, the central processing unit 20 correlates the key velocity Rref2 to Rref9 with different values of MIDI velocity through the repetition of the loop consisting of steps S10 to S14.

When the central processing unit 20 correlates the key velocity Ref9 with a value of MIDI velocity V at step S13, the answer at step S14 is changed to negative "No", and the central processing unit 20 checks the register to see whether or not the key number Kn is less than 88 as by step S15. While the answer at step S15 is being given affirmative "Yes", the central processing unit 20 increments the key number Kn as by step S16, and reiterates the loop consisting of steps S2 to S16. Thus, the key velocity Ref1 to Ref9 is correlated with values of MIDI velocity V for every black/white key 1$a$/1$b$ as shown in FIG. 7. The key velocity Rref9 is expressed as Rmax, and the key velocity Rmax is correlated with the maximum value of MIDI velocity Vmax as shown in FIG. 5.

Upon completion of the experiments on all the black and white keys 1$a$/1$b$, the answer at step S15 is changed to negative "No". Then, the central processing unit 20 returns to the main routine program. The correlation between the key velocity R.no. and the MIDI velocity V is tabled by the central processing unit 20, which serves as the editor 34, and the reference tables 31 are stored in the flash-type electrically erasable and programmable read only memory 21. Nevertheless, the nine pairs of key velocity and MIDI velocity are insufficient to the automatic player 220, because the MIDI velocity is much greater in resolution than the reference tables 31. The central processing unit 20 supplements the relation between the key velocity Ref' and the MIDI velocity V through a linear interpolation or another interpolation on a non-linear curve such as, for example, a spline curve. If the MIDI velocity V is less than Vmin, the central processing unit 20 gives the key velocity Rmim to the MIDI velocity less than Vmim. Similarly, if the MIDI velocity V is greater than Vmax, the central processing unit 20 gives the key velocity Rmax to the MIDI velocity greater than Vmax.

As will be understood, the preliminary data producer 210 determines the relation between the key velocity R.no. and the MIDI velocity for individual acoustic piano 100. Even tough the acoustic piano 100, solenoid-operated key actuators 5 and hammer sensors 8 have their own individuality, the preliminary data producer 210 takes the individuality into account in the preparation of the reference tables 31. Thus, the preliminary data producer 210 makes the automatic player 220 reenact a performance at high fidelity.

Automatic Playing with Reference to Tables 31

Assuming now that a user instructs the electric system 200 to perform a piece of music on the acoustic piano 100, a set of music data codes expressing the piece of music is transferred from the memory device 23 or another external data source to the random access memory 22, and the main routine program starts periodically to branch to the subroutine program for the automatic player 220.

The central processing unit 20 searches the random access memory 22 to see whether or not a music data code to be immediately process is found. When the central processing unit 20 finds a music data code to be processed, the central processing unit 20 analyzes the music data code already fetched for the key number Kn, MIDI velocity and so forth, and a series of values of the MIDI velocity, which is expected to force the black/white key 1$a$/1$b$ to pass the reference point at the key velocity corresponding to the MIDI velocity stored in the music data code, is determined for the black/white key assigned the key number Kn as by step S21.

The central processing unit 20 specifies the reference table 31 labeled with the key number Kn, and accesses the reference table 31 with the series of values of MIDI velocity as by step S22. Values of the target key velocity Ref are periodically read out from the reference table 31 as by step S23, and are used in the servo control. In other words, the solenoid-operated key actuator 5 forces the black/white key 1*a*/1*b* to travel on the reference key trajectory at the target key velocity Ref as by step S24. If the MIDI velocity is less than Vmin, the target key velocity Ref is adjusted to the value Rmin. On the other hand, if the MIDI velocity is greater than Vmax, the target key velocity Ref is adjusted to the value Rmax.

The black/white key 1*a*/1*b* passes the reference point on the reference key trajectory at a proper value of the key velocity corresponding to the value of the MIDI velocity stored in the music data code, and gives rise to the hammer motion through the escape. The hammer 2 is brought into collision at the string 4, and the final hammer velocity is found to be equivalent to the value of MIDI velocity stored in the music data code. As a result, the acoustic piano tone is produced through the vibrations of the string 4 at the target value of the loudness.

The central processing unit 20 checks the random access memory 22 to see whether or not the automatic playing reaches the end of the music passage as by step S25. If there is found a music data code expressing an acoustic piano tone, the answer is given negative "No", and the central processing unit 20 returns to step S20. Thus, the central processing unit 20 reiterates the loop consisting of steps S20 to S25 until the answer at step S25 is changed to affirmative "Yes". When the answer at step S25 is given affirmative "Yes", the central processing unit 20 returns to the main routine program.

As will be appreciated from the foregoing description, the preliminary data producer 210 tailors the reference tables 31 for the automatic player piano, and the automatic player 220 controls the black and white keys 1*a* and 1*b* with reference to the reference tables 31. Even if the acoustic piano 100, solenoid-operated key actuators 5 and hammer sensors 8 have their own individuality, the relation between the key velocity R.no. and the MIDI velocity V is subjected to the influence of individuality, because the MIDI velocity V is determined on the basis of the series of values of the hammer position. Thus, the reference tables 31 exactly express the relation between the MIDI velocity and the key velocity Ref. While the automatic player is reenacting a performance, the acoustic piano tones are produced through the acoustic piano 100 at high fidelity.

The preliminary data processor 210 determines correlation between the lowest key velocity Rmin and the MIDI velocity Vmin through the loop consisting of steps S3 to S8. When the MIDI velocity stored in a music data code is less than the MIDI velocity Vmin, the automatic player 220 drives the black/white key 1*a*/1*b* at the key velocity Rmin so that all the acoustic piano tones are produced along the music passage. Thus, the automatic player 220 does not fail to produce the faint tones.

Second Embodiment

Figure 9:
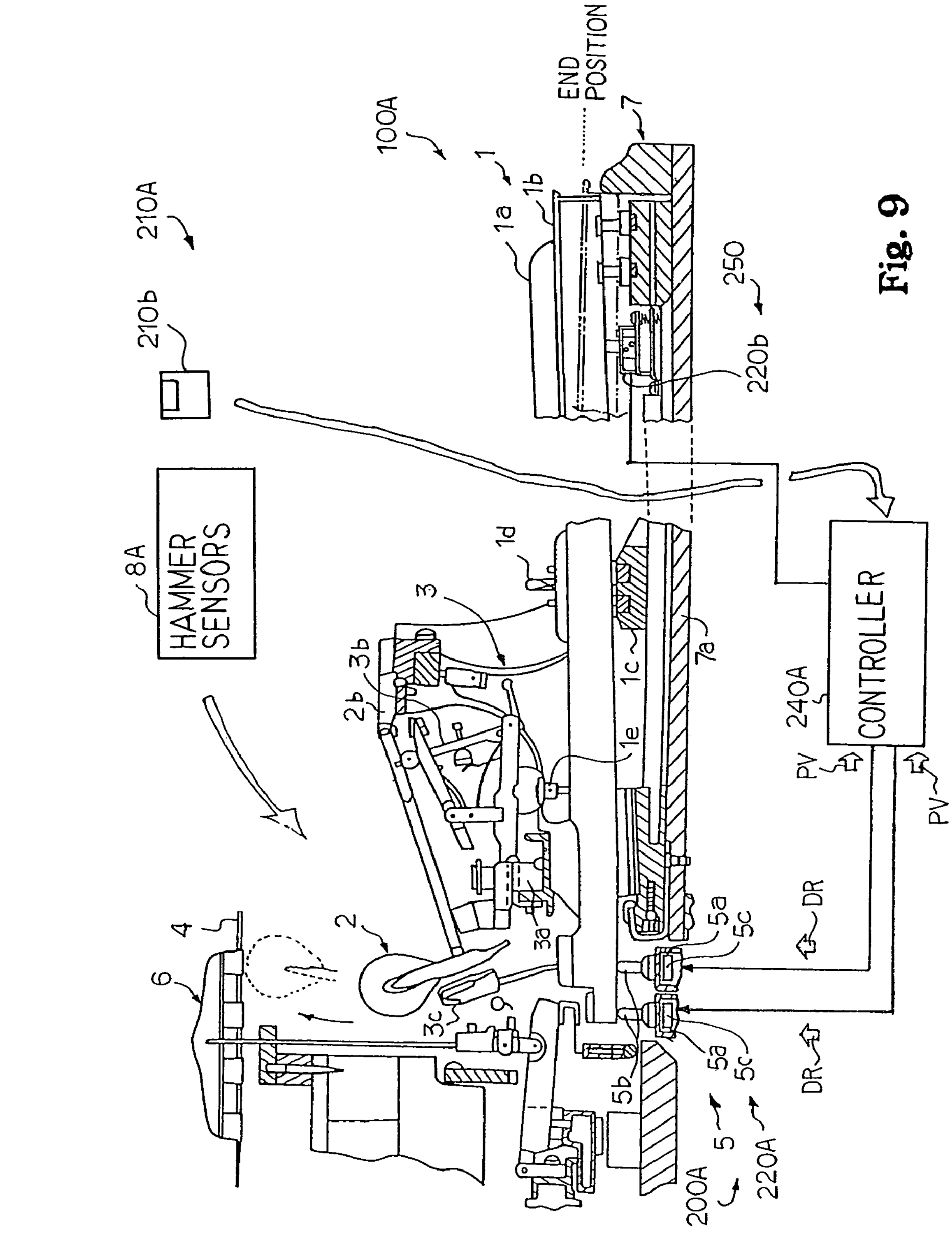
FIG. 9 is a schematic view showing a portable preliminary data producer according to the present invention.

Turning to FIG. 9 of the drawings, a portable preliminary data producer 210A is illustrated together with an automatic player piano. The automatic player piano implementing the second embodiment largely comprises an acoustic piano 100A and an electric system 200A. The acoustic piano 100A is similar in structure to the acoustic piano 100, and, accordingly, the component parts of the acoustic piano 100A are labeled with the references designating the corresponding component parts of the acoustic piano 100.

The electric system 200A serves as an automatic player 220A and a recorder 250. The automatic player 220A is similar to the automatic player 220, and component parts are labeled with the references designating the corresponding parts of the automatic player 220. A controller 240A is shared between the automatic player 220A and the recorder 250, and key sensors 220*b* are connected to the controller 240A for recording a performance on the acoustic piano 100A.

The portable preliminary data producer 210A includes detachable hammer sensors 8A and a portable information storage medium 210*b* such as, for example, a floppy disk (trademark). The detachable hammer sensors 8A are installed in the vicinity of the hammer trajectories, and are connected to the controller 240A. The detachable hammer sensors 8A produce the hammer position signals, and the hammer position signals are supplied to the controller 240A.

The subroutine program for the preliminary data producer is stored in the portable information storage medium 210*b*, and is installed in the controller 240A. The subroutine program for the preliminary data producer realizes the table producer 9 including the editor 34 and experimental routine 33, and makes the motion controller 11 further serve as the MIDI data-to-key velocity converter 30.

The behaviors of experimental routine, table producer, editor and MIDI data-to-key velocity converter 30 have been described in conjunction with the preliminary data producer 210. For this reason, no further description is hereinafter incorporated for the sake of simplicity.

The portable preliminary data producer 210A achieves all the advantages of the portable preliminary data producer 210. A worker carries the portable preliminary data producer 210A to user's home, and prepares the reference tables 31 in the controller 240A.

Although particular embodiments of the present invention have been shown and described, it will be apparent to those skilled in the art that various changes and modifications may be made without departing from the spirit and scope of the present invention.

The hammer sensors 8 may be of the type converting hammer velocity, acceleration or force to an electric signal, because these sorts of physical quantity are convertible to one another. A sort of hammer sensor of the type monitoring the hammers 2 in a range narrower than the hammer stroke is available for the preliminary data producer 210. A combination between a piece of magnet and a semiconductor Hall element or a combination between a weight pieces and beams, on which a Wheatstone bridge circuit is formed, may serve as the hammer sensor 8.

The preliminary data producer 210 may determine relation between the MIDI velocity and actual velocity of another sort of movable component parts such as, for example, black/white keys 1*a*/1*b* or jacks 3*b*. The sort of movable component parts participate in the generation of the acoustic piano tones. In case where the preliminary data producer 210 determines the relation between the MIDI velocity and the actual velocity of other movable component parts, the sensors monitor the movable component parts. More than one sort of component parts may be monitored with appropriate sensors. Thus, the hammers 2 do not set any limit to the technical scope of the present invention.

The solenoid-operated key actuators 5 do not set any limit to the technical scope of the present invention. Pneumatic actuators, hydraulic actuators or electric motors such as stepping motors may be used as the key actuators.

The solenoid-operated key actuators 5 may drive another sort of component parts such as, for example, action units 3 or hammers 2.

The pulse width modulator 25 may be replaced with a level-shift circuit. In this instance, the central processing unit 20 varies the magnetic force exerted on the plunger 5*b* with the potential level of the driving signal.

The target key velocity Ref' at the reference point does not set any limit to the technical scope of the present invention. The MIDI velocity may be correlated with another sort of physical quantity such as, for example, the amount of current applied to the solenoid-operated key actuators 5 or the magnitude of force exerted on the black and white keys 1*a*/1*b*.

The MIDI protocols do not set any limit on the technical scope of the present invention. Any sort of data protocols is available for the automatic playing in so far as the music data codes express tones to be produced.

The thresholds Vmin1 and Vmin2 may be variable. While human players are performing pieces of music, the preliminary data processor 210 gathers the pieces of motion data expressing the actuator hammer velocity, and determines the least value of the actual hammer velocity. The preliminary data producer 210 compares the least value of the actual hammer velocity with the values of the actual hammer velocity corresponding to the thresholds Vmin1 and Vmin2. If the least value of the actual hammer velocity is less than the values of the actual hammer velocity corresponding to the thresholds Vmin1 and Vmin2, the preliminary data producer 210 changes the thresholds Vmin1 and Vmin2 from the present values to proper values. After the change, the preliminary data producer 210 may produce a prompt message for the preparation of the reference tables 31.

Otherwise, the user may instruct the preliminary data producer 210 to change the thresholds Vmin1 and Vmin2. In case where the preliminary data producer 210 determines relation between the velocity of the black and white keys 1*a*/1*b* and the MIVI velocity, it is desirable to give the thresholds Vmin1 and Vmin2 greater than those of the embodiment from the viewpoint of stability.

The nine test values Ref1 to Ref9 do not set any limit to the technical scope of the present invention. More than nine test values or less than nine test values may be employed in the experimental routine 33.

In another embodiment, the preliminary data producer 210 may prepare the reference tables 31 on the assumption that the black and white keys 1*a* and 1*b* take the uniformly accelerated motion or another sort of motion expressed by a high-order function on the test key trajectories.

The grand piano or an upright piano, i.e., acoustic piano 100 does not set any limit to the technical scope of the present invention. The present invention may appertain to another sort of keyboard musical instrument such as, for example, an electronic piano, an organ or a harpsichord. The present invention may further appertain to another sort of musical instrument such as, for example, a percussion instrument or a wind instrument. A celesta is an example of the percussion instrument. Keys of a wind instrument equipped with a small blower may be changed between open state and closed state by an automatic player.

First, the component parts are correlated with claim languages in an independent claim defining a preliminary data processor as follows. The MIDI velocity or loudness is corresponding to an "attribute", and the pieces of data expressing the key velocity Ref serve as "pieces of control data". The pieces of data expressed by the duty ratio of the driving signals DR are corresponding to "pieces of target data". The acoustic piano 100 or 100A, motion controller 1, servo controller 12 and solenoid-operated key actuators 5 as a whole constitute a "musical instrument". The combination of experimental routine 33 and driver routine 32 or the central processing unit 20 executing steps S2, S3, S10 and S11 serves as a "driving system", and the solenoid-operated key actuators 5 are corresponding to "actuators". The black and white keys 1*a*/1*b*, action units 3, hammers 2 and strings 4 as a whole constitute a "tone generating system". The hammer sensors 8 and signal interfaces 24 form in combination a "data acquisition system". The hammer position signals HS are representative of "pieces of actual data" expressing the hammer positions. The hammers 2 serve as "component parts" of the tone generating system. The experimental routine 33 and editor 34, or the central processing unit 20 executing steps S4, S9, S12 and S13 serves as a "data processor".

The component parts are correlated with claim languages in an independent claim defining an automatic player as follows. The pieces of music data, tone generating system, component parts, pieces of control data, pieces of target data, attribute, pieces of actual data, data acquisition system and data processor are same as those described in conjunction with the preliminary data producer. The black and white keys 1*a*/1*b*, action units 3, hammers 2 and strings 4 as a whole constitute a "musical instrument". The preliminary processor 10, motion controller 11 and servo controller 12 as a whole constitute a "music data processing system". The pieces of data expressing the MIDI velocity serve as "pieces of music sub-data".

The correlation between the component parts and the claim languages are applicable to that in an independent claim defining a musical instrument.

What is claimed is:

1. A preliminary data producer correlating pieces of music data expressing an attribute of tones with pieces of control data used in an automatic player on a musical instrument for producing said tones, comprising:

a driving system producing pieces of target data expressing target motion of a tone generating system incorporated in said musical instrument on the basis of said pieces of control data, and supplying said pieces of target data to actuators of said musical instrument so as to give rise to said target motion of said tone generating system;

a data acquisition system monitoring said tone generating system, and producing pieces of actual data expressing motion of component parts of said tone generating system; and a data processor analyzing said pieces of actual data for said attribute, and determining relations between said pieces of control data and said pieces of music data.

2. The preliminary data producer as set forth in claim 1, in which said data processor seeks a certain piece of said actual data expressing a minimum of said attribute, and correlates one of said pieces of control data corresponding to said certain piece of actual data with one of said pieces of music data so that the pieces of music data expressing said attribute less than said minimum are correlated with said one of said pieces of control data in performances carried by said automatic player.

3. The preliminary data producer as set forth in claim 2, in which said data processor have thresholds different from one another, and said one of said pieces of control data corresponding to said certain piece of actual data is to be fallen within the range between said thresholds.

4. The preliminary data producer as set forth in claim 1, in which said pieces of control data express a physical quantity so as to make said pieces of target data express said target motion, and said driving system makes said actuators give rise to said target motion at different values of said physical quantity spaced at intervals.

5. The preliminary data producer as set forth in claim 4, in which other pieces of said control data different from said pieces of control data are determined through an interpolation.

6. The preliminary data producer as set forth in claim 1, in which said attribute is loudness varied in proportion to a physical quantity of said component parts through which said pieces of control data make said pieces of target data express said target motion.

7. The preliminary data producer as set forth in claim 6, in which said physical quantity is velocity.

8. The preliminary data producer as set forth in claim 6, in which said loudness is defined in selected ones of said pieces of music data together with a number indicative of a pitch name of one of said tones and an instruction to make said one of said tones occur through said tone generating system.

9. An automatic player for performing a music passage on a musical instrument, comprising:

actuators provided for a tone generating system of said musical instrument, and responsive to driving signals representative of pieces of target data so as to give rise to a target motion of said tone generating system for producing tones;

a music data processing system producing said driving signals on the basis of pieces of music data expressing said tones to be produced; and a preliminary data producer correlating pieces of music sub-data incorporated in said pieces of music data and expressing an attribute of said tones with pieces of control data, and including a driving system producing said pieces of target data expressing target motion of said tone generating system on the basis of said pieces of control data and supplying said pieces of target data to said actuators so as to give rise to said target motion of said tone generating system, a data acquisition system monitoring said tone generating system and producing pieces of actual data expressing motion of component parts of said tone generating system and a data processor analyzing said pieces of actual data for said attribute and determining relations between said pieces of control data and said pieces of music sub-data.

10. The automatic player as set forth in claim 9, in which said data processor seeks a certain piece of said actual data expressing a minimum of said attribute, and correlates one of said pieces of control data corresponding to said certain piece of actual data with one of said pieces of music sub-data so that the pieces of music sub-data expressing said attribute less than said minimum are correlated with said one of said pieces of control data in performances carried by said automatic player.

11. The automatic player as set forth in claim 10, in which said data processor have thresholds different from one another, and said one of said pieces of control data corresponding to said certain piece of actual data is to be fallen within the range between said thresholds.

12. The automatic player as set forth in claim 9, in which said pieces of control data express a physical quantity so as to make said pieces of target data express said target motion, and said driving system makes said actuators give rise to said target motion at different values of said physical quantity spaced at intervals.

13. The automatic player as set forth in claim 12, in which other pieces of said control data different from said pieces of control data are determined through an interpolation.

14. The automatic player as set forth in claim 9, in which said attribute is loudness varied in proportion to a physical quantity of said component parts through which said pieces of control data make said pieces of target data express said target motion.

15. The automatic player as set forth in claim 14, in which said physical quantity is velocity.

16. A musical instrument for producing tones, comprising:

a tone generating system producing said tones, and including component parts participating in generation of said tones;

an automatic player actuating said tone generating system without a fingering of a human player, and including actuators provided for said tone generating system and responsive to driving signals representative of pieces of target data so as to give rise to a target motion of said tone generating system for producing said tones, and a music data processing system producing said driving signals on the basis of pieces of music data expressing said tones to be produced; and a preliminary data producer correlating pieces of music sub-data incorporated in said pieces of music data and expressing an attribute of said tones with pieces of control data, and including a driving system producing said pieces of target data expressing said target motion of said tone generating system on the basis of said pieces of control data and supplying said pieces of target data to said actuators so as to give rise to said target motion of said tone generating system, a data acquisition system monitoring said tone generating system and producing pieces of actual data expressing motion of said component parts of said tone generating system and a data processor analyzing said pieces of actual data for said attribute and determining relations between said pieces of control data and said pieces of music sub-data.

17. The musical instrument as set forth in claim 16, in which said tone generator has a mechanical structure including an array of keys to be independently moved, action units connected to said keys so as to be actuated by the moved keys, hammers connected to said action units so as to be rotated by the actuated action units and strings stretched over said hammers so as to be struck with the rotated hammers.

18. The musical instrument as set forth in claim 17, in which said hammers serve as said component parts.

19. The musical instrument as set forth in claim 18, in which velocity of said hammers is proportional to loudness of said tones serving as said attribute.

20. The musical instrument as set forth in claim 16, in which said data processor seeks a certain piece of said actual data expressing a minimum of said attribute, and correlates one of said pieces of control data corresponding to said certain piece of actual data with one of said pieces of music sub-data so that the pieces of music sub-data expressing said attribute less than said minimum are correlated with said one of said pieces of control data in performances carried by said automatic player.

* * * * *